(12) United States Patent
Brock et al.

(10) Patent No.: US 7,367,739 B2
(45) Date of Patent: May 6, 2008

(54) TWO COMPONENT SEAL

(75) Inventors: Knute K. Brock, Bismarck, ND (US); William C. Shelbourn, Bismarck, ND (US); Robert E. Purvis, Bloomington, MN (US); Timothy T. O'Brien, Cottage Grove, MN (US)

(73) Assignee: Clark Equipment Company, Woodcliffe Lake, NJ (US)

( * ) Notice: Subject to any disclaimer, the term of this patent is extended or adjusted under 35 U.S.C. 154(b) by 267 days.

(21) Appl. No.: 10/909,739

(22) Filed: Aug. 2, 2004

(65) Prior Publication Data

US 2006/0022412 A1 Feb. 2, 2006

(51) Int. Cl.
*F16C 11/00* (2006.01)

(52) U.S. Cl. .................. 403/39; 414/723; 403/288

(58) Field of Classification Search .............. 277/358, 277/361, 364, 399, 402, 403, 407, 408, 551, 277/549, 562, 563, 572, 573, 565, 390, 394, 277/395, 349, 500, 589; 305/102, 118; 403/151, 403/158, 161, 162, 164, 288, 38, 39; 384/276; 414/723, 726
See application file for complete search history.

(56) References Cited

U.S. PATENT DOCUMENTS

| | | | | |
|---|---|---|---|---|
| 2,075,769 A | * | 3/1937 | McCormack | 277/396 |
| 3,554,588 A | * | 1/1971 | Reinsma et al. | 403/154 |
| 3,606,351 A | | 9/1971 | Green | 272/60 |
| 3,680,924 A | * | 8/1972 | Otto et al. | 305/102 |
| 3,787,098 A | * | 1/1974 | Orr | 305/102 |
| 3,822,890 A | | 7/1974 | Bourgeois | 277/65 |
| 4,149,758 A | * | 4/1979 | Livesay | 305/118 |
| 4,195,852 A | * | 4/1980 | Roley et al. | 277/380 |
| 4,251,182 A | * | 2/1981 | Schroeder | 414/723 |
| 4,331,339 A | * | 5/1982 | Reinsma | 305/103 |
| 4,344,629 A | * | 8/1982 | Oelke | 277/306 |
| 4,434,985 A | | 3/1984 | Sonnerat | 277/37 |
| 4,457,521 A | * | 7/1984 | Morley | 305/103 |
| 4,582,366 A | | 4/1986 | Burfield et al. | 305/11 |
| 4,772,150 A | * | 9/1988 | Horton | 403/39 |
| 5,618,116 A | | 4/1997 | Ishikawa | 384/607 |

(Continued)

OTHER PUBLICATIONS

Copy of the International Search Report and Written Opinion of Application No.: PCT/US2005/026112.

*Primary Examiner*—Jack W. Lavinder
(74) *Attorney, Agent, or Firm*—Westman, Champlin & Kelly, P.A.

(57) ABSTRACT

A pair of pivoting parts are held together with a pin, with a first part, such as a rod end of a hydraulic actuator, positioned between two flanges of a bracket, with the flanges having surfaces mating with sides surfaces of the rod end. A seal is placed in each of a pair of recesses on the opposite side surfaces of the rod end to provide an annular seal around the surface of the pin as the parts pivot, and also having a flange forming a side seal that seats on one of the mating surfaces of the bracket at a location spaced outwardly from the pin and extending annularly around the pin. The seal portion engaging the pin is spaced inwardly from the respective side surface of the bracket, and the outer annular lip seals a space surrounding the pin to form a pocket to receive grease that is used to lubricate the pin relative to the rod end.

11 Claims, 3 Drawing Sheets

U.S. PATENT DOCUMENTS

| | | | |
|---|---|---|---|
| 5,630,673 A * | 5/1997 | Krzywanos et al. | 403/158 |
| 5,763,956 A * | 6/1998 | Metz et al. | 305/102 |
| 5,975,534 A | 11/1999 | Tajima et al. | 277/353 |
| 6,059,663 A * | 5/2000 | Jones et al. | 464/133 |
| 6,102,408 A * | 8/2000 | Anderton et al. | 277/370 |
| 6,186,507 B1 | 2/2001 | Oldenburg | 277/353 |
| 6,206,380 B1 | 3/2001 | Miyazaki | 277/551 |
| 6,209,882 B1 * | 4/2001 | Riess | 277/562 |
| 6,283,667 B1 * | 9/2001 | Neitzel | 403/158 |
| 6,382,742 B1 * | 5/2002 | Hasselbusch et al. | 305/102 |
| 6,637,754 B1 | 10/2003 | Ohtsuki et al. | 277/549 |
| 6,783,129 B2 * | 8/2004 | Akita et al. | 277/349 |
| 2003/0189298 A1 | 10/2003 | Mizuta et al. | 277/549 |
| 2004/0207160 A1 * | 10/2004 | von Geisau et al. | 277/549 |

* cited by examiner

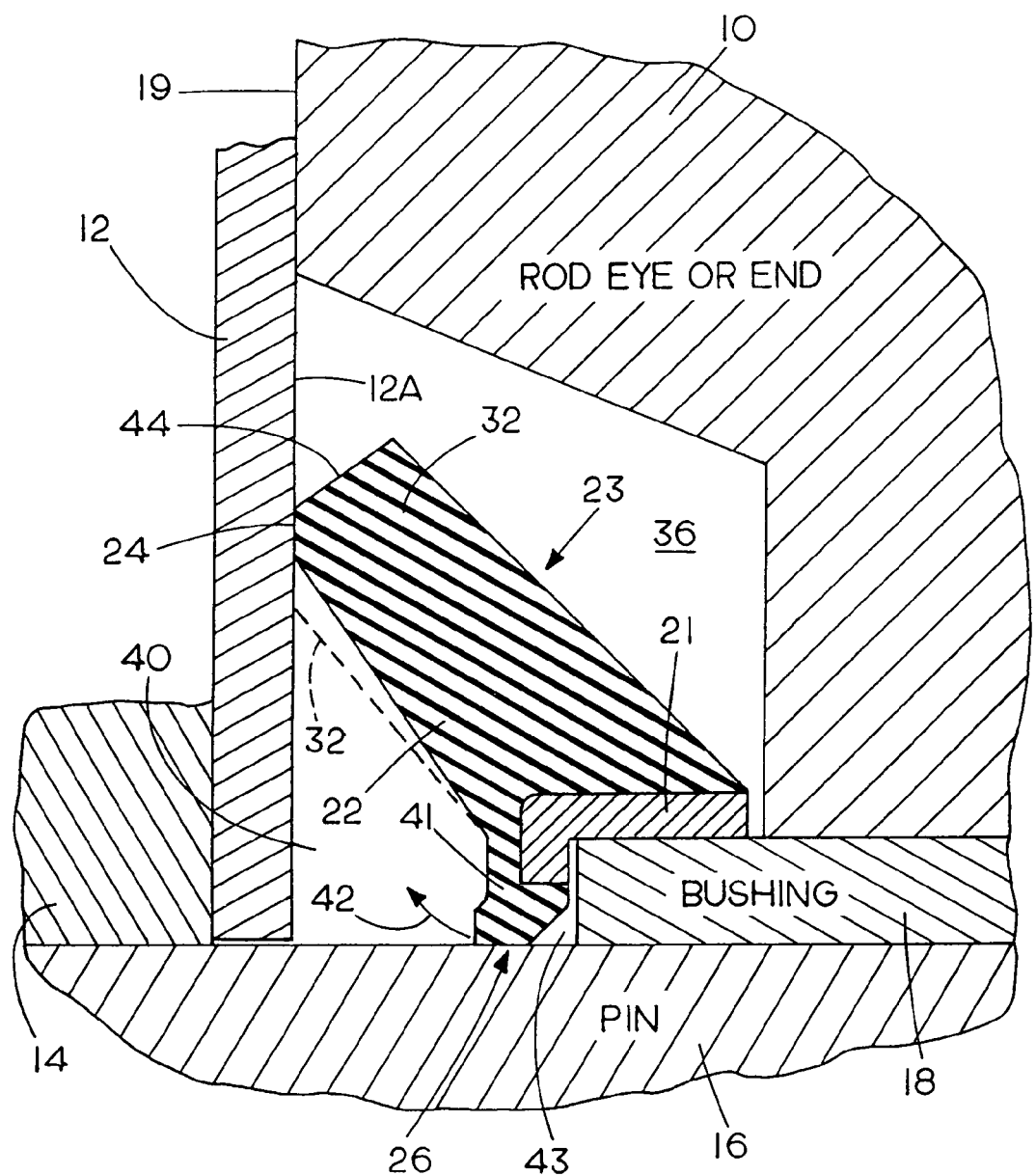

TWO COMPONENT SEAL

BACKGROUND OF THE INVENTION

This invention relates to a seal for pins that connect two pivoting parts designed to keep dust away from a bushing for the pin, and to keep lubricating grease trapped for lubricating sliding side surfaces. In an exemplary application such as holding the rod end of a hydraulic cylinder to a bracket at the top of a loader bucket, the pin is generally held stationary, and the rod end will pivot on the pin as the bucket is tilted.

Such connecting pins will operate in dusty conditions and it is important for the life of the bushing that is used on the rod end to keep grit and dirt out, and also to keep grease, used as a lubricant, in place.

Excessive introduction of dirt in the pivoting parts causes wear and the need for replacement.

A rod end of a hydraulic cylinder is generally positioned between two side hub members and connects to the hubs with a cylindrical pin. Dust and dirt can get in along the sides of the rod end, as well as along the surfaces of the pin. The present invention provides for a seal that will prevent introduction of dust and dirt, and will also aid in maintaining a lubricant, such as grease, on the relatively moving parts.

SUMMARY OF THE INVENTION

The present disclosure relates to a seal structure that is used in connection with a cylindrical bore in a movable member that receive a pin, and wherein the pin and the surface of the bore must relatively rotate. Specifically, the seal is designed to operate between two surfaces of a bracket or support that flank or are positioned on opposite sides of the movable member, such as a rod end of an actuator, so that dust is kept away from the bushing by sealing along surfaces of the bracket on an annular line spaced outwardly from the pin, and also by sealing directly on the exterior surface of the pin.

The seal is an annular seal that has two sealing lips, one for sealing on the pin outer surface and one on the side surfaces of the bracket. The lips form a grease pocket between one of the side surfaces on the bracket supporting the rod end so that there is a supply of lubricant on the outer sides of the rod end while dust and dirt are excluded from the inner surface of the rod end. A bushing is normally used in the rod end for receiving the pin.

While a skid steer loader tilt cylinder connection pin is shown as an example of use, the present device finds application where two members, one rotating or pivoting and the other stationary are held together with a pin that is greased. Other examples would be excavator boom pivot mountings, pivoting load arms on utility vehicles and the like.

Also the seal has application on a rotating idler roller or sprocket on a stationary shaft and for roller seals for track idler rollers of a track driven vehicle.

BRIEF DESCRIPTION OF THE DRAWINGS

FIG. 3 is an enlarged fragmentary sectional view of one side of the seal of the present invention.

DETAILED DESCRIPTION OF THE PREFERRED EMBODIMENTS

Figure 1:
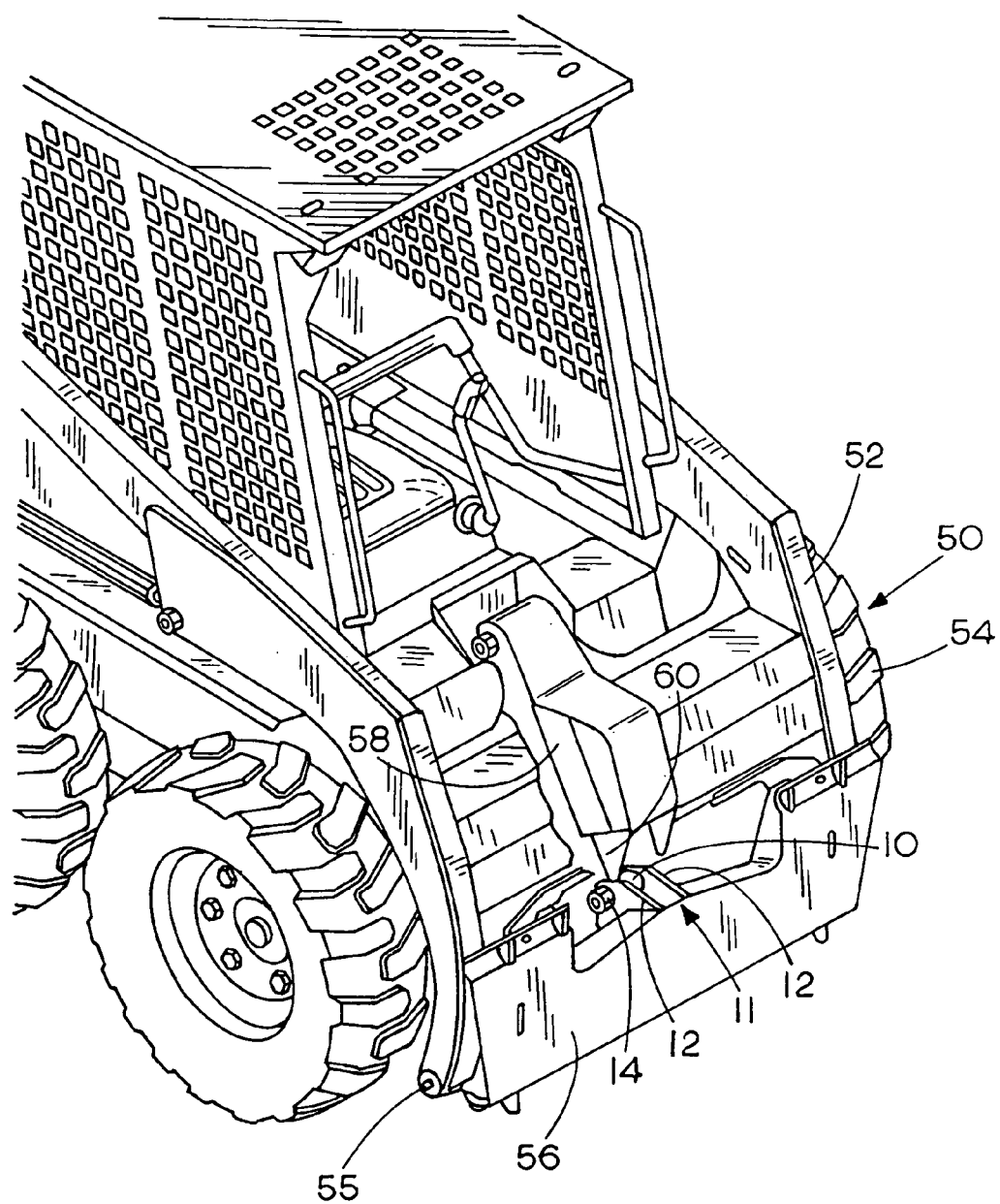
FIG. 1 is a fragmentary front perspective view of a front end of a typical skid steer loader showing an actuator having a rod end with a seal made according to the present invention.

In FIG. 1, a skid steer loader 50 is shown as one example of an application of the invention. The loader 50 has lift arms 52 that are raised and lowered. As can be seen, the loader is supported on wheels 54 for movement along the ground. The lift arms 52 have forward ends 55 on which a quick attachment plate 56 is pivotally mounted. A hydraulic actuator shown at 58 has a rod 60, which includes a rod end 10 forming a first member at its outer end. The rod end 10 is used for tilting the plate 56 about the axis of pins 55, at the lower ends of the lift arms. The plate 56 is used for mounting a bucket or other attachments.

The tilting plate has a rod end attachment brackets 11 that is a second member formed with spaced side plates or ears 12, which are fixed to the tilting plate spaced apart sufficiently so the rod end interfits between plates 12, or in other words the bracket 11 receives the rod end. On the outer sides of these plates 12, there are tubular hubs 14 that have bores that will receive ends of a connecting pin 16 used for connecting the rod end or eye 10 to the attachment plate 56. The pin 16 is held in one hub 14 with a suitable roll pin 15 to prevent rotation relative to the hubs 14 and the side plates 12. As the attachment plate 56 is tilted about the pins 55, it can be seen that the rod end 10 has to pivot on the pin 16.

The rod end or eye 10 has a bushing 18 on the interior thereof that receives the pin 16. The ends of the bushing 18 are set inwardly from side end surfaces 19 of the rod. The surfaces 19 are closely spaced from and can actually rub against the inner surfaces 12A of the side ears or plates 12 forming the second member 11, as the attachment plate 56 is tilted.

The bushing 18 provides a low friction pin mounting, but the end surfaces 19 of the rod end slide against the inner surfaces 12A of the plates 12, and this also can result in wear.

Figure 2:
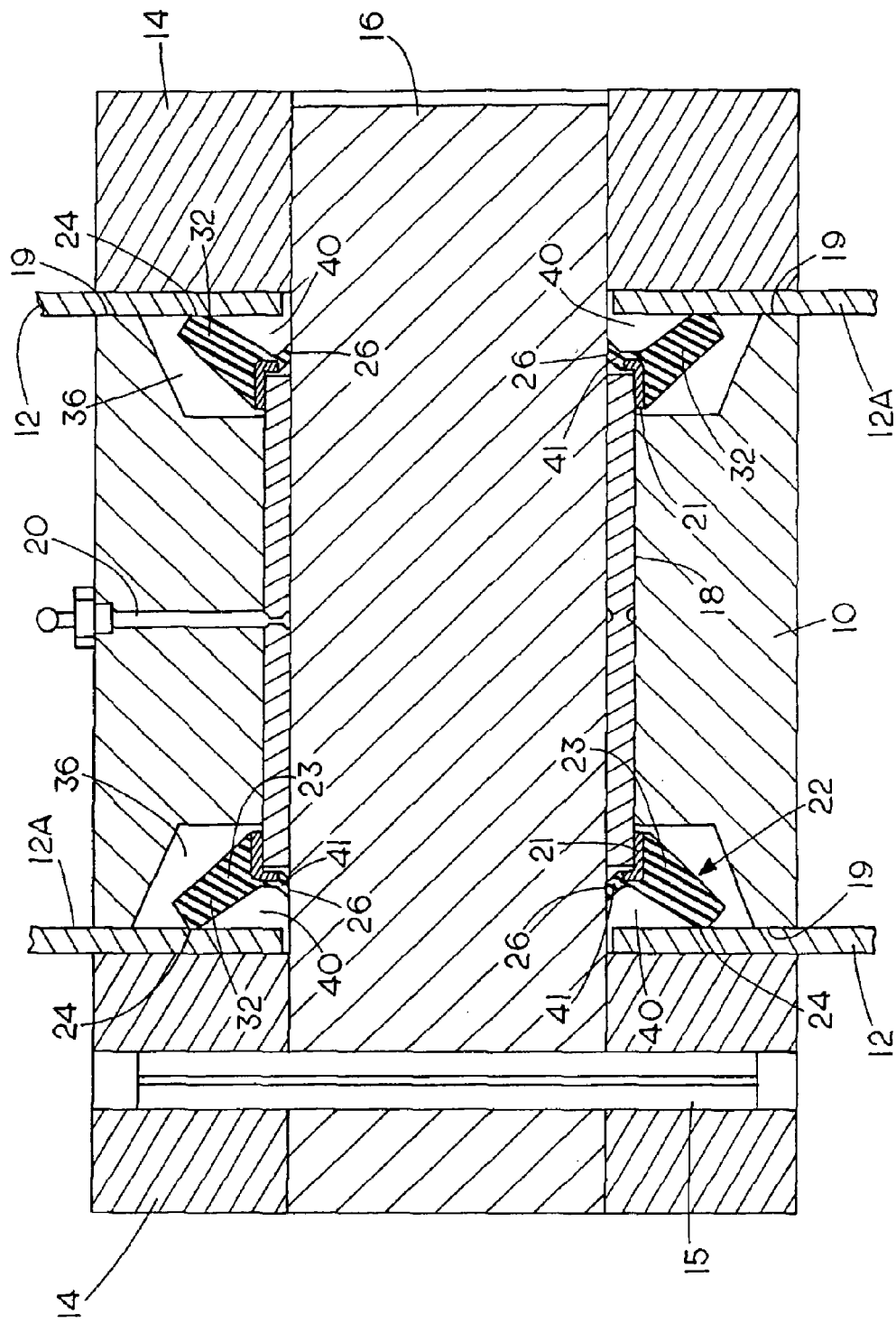
FIG. 2 is an enlarged sectional view of the rod end and pin, utilizing a seal of the present invention.

The loader operates under conditions where dirt and dust will drop onto the rod end 10 and tend to get in between the surfaces 12A and the end surfaces 19 of the rod end. Also, dirt and dust can work in between the bore of the ears 14 and the side plates 12, and the pin 16, which is slightly smaller than the bore. To provide for a dust seal as well as providing for permitting grease to be retained between the surfaces 12A and 19, a seal 22 is provided. As shown in FIG. 2, a grease fitting and passageway 20 are provide for permitting grease to be forced into the space between the pin 16 and the bushing 18, and also to be forced outwardly toward the ends of the bushing 18.

Each seal 22 has a metal support ring 21 that supports an elastomeric seal ring 23. The seal ring 23 has an annular first seal lip 24 that has an outer end or edge that resiliently engages and seals relative to the respective inside surfaces 12A of the two plates or ears 12. Each of the annular elastomeric seal rings 23 also has a resilient ring 41 having a second seal lip 26 that surrounds and resiliently rides against the outer surface of the pin 16 to seal the respective ends of the hubs 14 against dust coming into the bushing from the hubs.

The first seal lip 24 has an edge portion that rides against the adjacent surface 12A of the respective side plate 12 under a resilient force. Each seal 22, as shown, includes the elastomeric ring section 23 that has an outwardly tapered, annular flange 32. The outer edge of the flange forms the first seal lip 24. The support ring 21 of metal that supports the elastomeric ring 23 will press fit onto the respective end of the bushing 18 that protrudes beyond one of the annular recessor or cavities 36 formed in and surrounding the bore of the rod end 10 to retain the seal in position.

The flange 32 is annular and tapers outwardly from the support ring and has resilience and length so a seal in maintained with the lip 24. The lip 24 will continue to seal even with a substantial amount of axial movement of the rod end relative to the side plates or ears 12.

The resilient annular second seal lip portion 26 on ring 41 that rides on the pin 16 has an internal diameter that is smaller than the outer diameter of the pin 16, so that the resilient second seal lip portion 26 is compressed and under some load as it rides on the pin to provide an adequate dust seal against dust or other materials entering axially along the outer surface of the pin. The second seal lip keeps dust and dirt away from the bushing. Also, the second seal lip 26 retains clean grease in the pin to bushing area and forms an annular pocket 43 that acts as a grease reservoir (see FIG. 3).

The outwardly tapered flange 32, which includes the first seal lip 24, is also resilient (rubber, fluorocarbon or other elastomeric material), and as shown in FIG. 3, it will move to its solid line position that is shown, from a position with the outer or lower side shown in dotted lines, to accommodate the installation of the rod end between plates 12 while the seal is in place. The resilient seating of the seal against the respective surface 12A.

The inner resilient ring 42, which has the seal lip 26, and the flange 32 form a grease pocket 40, into which grease that is forced out along the bushing 18 and extruded past the seal lip portion 26 is held. The resilient ring 41 expands and lets grease enter into the pocket 40, as indicated by the arrow 42. This grease pocket 40 then provides some lubrication along the wall surface 12A that lubricates any moving or relatively rubbing parts between the side surfaces 19 of the rod end 10 and the side plates 12. Grease in the pocket 40 can also block dirt from entering the pocket 43, which dirt would work in between the pin 16 and the bushing 18 to cause wear.

The double seal, including the seal line of seal lip 24 against the adjacent surface 12A and the seal lip 26 against the outer surface of the pin 16, ensures that dust will not enter into the bushing. If the rod end shifts slightly from side to side, grease in the pocket 40 between the two sealing lips or regions 24 and 26 also helps to keep external contaminants from reaching the bushing surface. When the joint is greased through the grease fitting and passageway 20, the clean grease are will flow into the area between the two seals forming the pocket 40, and the old contaminated grease that is present in the pocket 40 between these lips is pushed outwardly past the lip 24 and along the side surfaces of the rod end, and the inner surfaces of side plates 12.

The rod end 10 having a seal 22 on each side, is easily installed because the seal lips will resiliently move out of the way for movement of the rod end into the position between the two sides plates 12.

The outer lip surface 44 is cylindrical and when the pin is horizontal, as dirt falls on the top side, the radius causes the dirt to tend to slide off in each direction, allowing gravity to cause the dirt to fall away and not enter into the pocket 40.

Although the present invention has been described with reference to preferred embodiments, workers skilled in the art will recognize that changes may be made in form and detail without departing from the spirit and scope of the invention.

What is claimed is:

1. A seal for a pin holding a first member relative to a second member wherein the first and second members have mating facing surfaces perpendicular to a central axis of the pin, the seal having a resilient ring for surrounding and engaging the pin, and forming an annular seal on the pin, and the resilient ring having an annular portion forming an annular lip spaced radially outwardly from the pin, to engage and seal on a mating adjacent perpendicular surface of the second member, the seal being carried by the first member;
    wherein the seal is configured to hold lubricant in a first pocket between the resilient ring, the pin, and the first member, and in a second pocket between the resilient ring, the pin, and the mating adjacent perpendicular surface of the second member;
    wherein the resilient ring is configured to allow lubricant to flow from the first pocket into the second pocket, and from the second pocket outwardly past the annular lip and along the mating facing surfaces; and
    wherein lubricant in the second pocket inhibits external contaminants from reaching the first pocket;
    wherein the first member includes a bore and a bushing seated in the bore, the bushing configured to receive the pin, and wherein the first pocket is between the resilient ring, the pin, and the bushing.

2. The seal of claim 1, wherein the annular portion of the seal tapers toward the second member to a location wherein the annular lip thereon engages the mating perpendicular surface at a position spaced outwardly from the pin to form the second pocket on the side of the seal facing toward the mating perpendicular surface of the second member.

3. The seal of claim 1, wherein the mating facing perpendicular surfaces of the first and second members are supported to be substantially contiguous to each other, the pin passing through bores in both the first and second members to permit pivoting about the central axis of the pin between the first and second members.

4. The seal of claim 1, wherein the mating surface of the first member includes an annular recess surrounding the pin, the seal being positioned within the recess.

5. The seal of claim 1, wherein lubricant enters the first pocket from between the pin and the first member.

6. An apparatus comprising:
    a first member having therein a bore and having a generally planar first surface, the first surface defining an annular cavity surrounding the bore;
    a second member having therein a bore and having a generally planar second surface mating with the first surface;
    a bushing seated in the bore of the first member, the bushing having an end protruding into the cavity;
    a pin held by the bushing and extending into the bore of the second members for holding the first member relative to the second member while allowing pivotal movement of the first member relative to the second member; and
    an annular seal seated on the end of the bushing, the seal surrounding the pin and including a first lip engaging the second surface and a second lip engaging the pin, the seal defining an annular pocket between the seal, the second surface, and the pin, the pocket holding lubricant that resists the passage of contaminants past the seal toward the bushing.

7. The apparatus of claim 6, wherein the seal includes a support ring, the support ring press fit onto the end of the bushing.

8. The apparatus of claim 6, wherein the end of the bushing is set inwardly from the first surface.

9. The apparatus of claim 6, wherein the seal defines an inner annular pocket between the seal, the bushing, and the pin, the inner pocket holding lubricant.

10. The apparatus of claim 9, wherein the second lip is configured to allow lubricant in the inner pocket to be pushed outwardly into the first-mentioned pocket.

11. The apparatus of claim 6, wherein the first lip is configured to allow lubricant in the pocket to be pushed outwardly along the first surface and the second surface.

* * * * *